(12) United States Patent
Chiong et al.

(10) Patent No.: US 12,024,596 B2
(45) Date of Patent: *Jul. 2, 2024

(54) ANTI-SOLVENT TECHNIQUE FOR RECOVERING AN ORGANIC SOLVENT FROM A POLYARYLENE SULFIDE WASTE SLUDGE

(71) Applicant: Ticona LLC, Florence, KY (US)

(72) Inventors: Hendrich A. Chiong, Cincinnati, OH (US); Venkata M. Nakkanti, Florence, KY (US)

(73) Assignee: Ticona LLC, Florence, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/903,151

(22) Filed: Sep. 6, 2022

(65) Prior Publication Data

US 2023/0086044 A1    Mar. 23, 2023

Related U.S. Application Data

(60) Provisional application No. 63/241,665, filed on Sep. 8, 2021.

(51) Int. Cl.
*B01D 3/36* (2006.01)
*C08G 75/0281* (2016.01)

(52) U.S. Cl.
CPC .......... *C08G 75/0281* (2013.01); *B01D 3/36* (2013.01)

(58) Field of Classification Search
CPC ............................ B01D 3/36; C08G 75/0281
See application file for complete search history.

(56) References Cited

U.S. PATENT DOCUMENTS 3,407,182 A    10/1968  Hinton
3,869,433 A     3/1975  Campbell
(Continued)

FOREIGN PATENT DOCUMENTS

CN     108069844    5/2018
CN     108219135    5/2018
(Continued)

OTHER PUBLICATIONS

International Search Report and Written Opinion for PCT/US2022/042614 dated Dec. 8, 2022, 9 pages.

*Primary Examiner* — Jonathan Miller
(74) *Attorney, Agent, or Firm* — Dority & Manning, P.A.

(57) ABSTRACT

Methods and systems are provided for recovering an organic solvent from a waste sludge generated during formation of a polyarylene sulfide. Methods include combining the waste sludge with an anti-solvent to create a dispersion, which includes a solid phase that includes a substantial portion of the impurities of the polyarylene sulfide formation and a liquid phase that contains the anti-solvent and organic solvent employed during formation of the polyarylene sulfide. The liquid phase is separated from the solid phase and then subjected to a distillation process to separate the organic solvent from the anti-solvent. Methods can also include forming the polyarylene sulfide by a polymerization process and thereafter purifying a slurry of the polyarylene sulfide. A liquid washing product is formed as a result of the purification process, which can be subjected to a distillation process that forms an organic solvent-rich stream and the waste sludge.

14 Claims, 5 Drawing Sheets

(56) References Cited

U.S. PATENT DOCUMENTS

| | | | |
|---|---|---|---|
| 3,919,177 A | 11/1975 | Campbell | |
| 4,038,259 A | 7/1977 | Campbell et al. | |
| 4,038,260 A | 7/1977 | Campbell | |
| 4,038,262 A | 7/1977 | Edmonds, Jr. | |
| 4,038,263 A | 7/1977 | Edmonds, Jr. et al. | |
| 4,039,518 A | 8/1977 | Campbell | |
| 4,056,515 A | 11/1977 | Vidaurri, Jr. | |
| 4,060,520 A | 11/1977 | Irvin | |
| 4,064,114 A | 12/1977 | Edmonds, Jr. | |
| 4,089,847 A | 5/1978 | Edmonds, Jr. et al. | |
| 4,096,132 A | 6/1978 | Edmonds, Jr. | |
| 4,368,321 A | 1/1983 | Sherk et al. | |
| 4,370,470 A | 1/1983 | Vidaurri et al. | |
| 4,393,197 A | 7/1983 | Edmonds, Jr. | |
| 4,415,729 A | 11/1983 | Scoggins et al. | |
| 4,451,640 A | 5/1984 | Shiiki et al. | |
| 4,495,332 A | 1/1985 | Shiiki et al. | |
| 4,500,706 A | 2/1985 | Mathis et al. | |
| 4,501,902 A | 2/1985 | Cleary | |
| 4,514,558 A | 4/1985 | Shiiki et al. | |
| 4,535,117 A | 8/1985 | Mathis et al. | |
| 4,537,953 A | 8/1985 | Kawakami et al. | |
| 4,613,654 A | 9/1986 | Katto et al. | |
| 4,645,826 A | 2/1987 | Iizuka et al. | |
| 4,699,975 A | 10/1987 | Katto et al. | |
| 4,734,484 A | 3/1988 | Alfes et al. | |
| 4,740,569 A | 4/1988 | Tieszen et al. | |
| 4,745,167 A | 5/1988 | Iizuka et al. | |
| 4,748,231 A | 5/1988 | Nesheiwat | |
| 4,767,841 A | 8/1988 | Goetz et al. | |
| 4,769,442 A | 9/1988 | Iwasaki et al. | |
| 4,786,711 A | 11/1988 | Senatore et al. | |
| 4,789,729 A * | 12/1988 | Nagira | C08G 75/0281 528/495 |
| 4,794,164 A | 12/1988 | Iwasaki et al. | |
| 4,795,671 A | 1/1989 | Shiiki et al. | |
| 4,812,539 A | 3/1989 | Iizuka et al. | |
| 4,814,430 A | 3/1989 | Iwasaki et al. | |
| 4,820,800 A | 4/1989 | Geibel et al. | |
| 4,820,801 A | 4/1989 | Inoue et al. | |
| 4,841,019 A | 6/1989 | Iwasaki et al. | |
| 4,841,022 A * | 6/1989 | Nakamura | C08G 75/0281 528/495 |
| 4,931,516 A | 6/1990 | Iizuka et al. | |
| 4,960,861 A | 10/1990 | Kotera et al. | |
| 4,976,825 A | 12/1990 | Iwasaki et al. | |
| 5,008,368 A | 4/1991 | Nesheiwat | |
| 5,015,725 A | 5/1991 | Scoggins et al. | |
| 5,023,315 A | 6/1991 | Ceurvorst et al. | |
| 5,037,954 A | 8/1991 | Nesheiwat et al. | |
| 5,053,486 A | 10/1991 | Nesheiwat | |
| 5,071,944 A | 12/1991 | Cliffton et al. | |
| 5,077,374 A | 12/1991 | Cleary | |
| 5,086,163 A | 2/1992 | Scoggins et al. | |
| 5,089,596 A | 2/1992 | Clifton et al. | |
| 5,089,597 A | 2/1992 | Nesheiwat et al. | |
| 5,093,468 A | 3/1992 | Kohler | |
| 5,110,902 A | 5/1992 | Scoggins et al. | |
| 5,126,430 A | 6/1992 | Senga et al. | |
| 5,128,445 A | 7/1992 | Scoggins et al. | |
| 5,134,224 A | 7/1992 | Nesheiwat et al. | |
| 5,145,946 A | 9/1992 | Fujii et al. | |
| 5,155,207 A | 10/1992 | Senatore et al. | |
| 5,167,775 A * | 12/1992 | Omori | C08G 75/0281 203/DIG. 19 |
| 5,179,194 A | 1/1993 | Kawakami et al. | |
| 5,194,580 A | 3/1993 | Koyama et al. | |
| 5,235,032 A | 8/1993 | Geibel et al. | |
| 5,241,043 A | 8/1993 | Senga | |
| 5,266,680 A | 11/1993 | Reed | |
| 5,278,283 A | 1/1994 | Miyoshi et al. | |
| 5,280,104 A | 1/1994 | Geibel et al. | |
| 5,296,579 A | 3/1994 | Geibel et al. | |
| 5,314,972 A | 5/1994 | Nesheiwat et al. | |
| 5,328,980 A | 7/1994 | Decker et al. | |
| 5,334,701 A | 8/1994 | Ash et al. | |
| 5,342,920 A | 8/1994 | Imai et al. | |
| 5,350,833 A | 9/1994 | Inoue et al. | |
| 5,352,768 A | 10/1994 | Stuber et al. | |
| 5,354,841 A | 10/1994 | Geibel et al. | |
| 5,360,890 A * | 11/1994 | Tanaka | C08G 75/0281 528/373 |
| 5,364,928 A | 11/1994 | Ash | |
| 5,438,115 A | 8/1995 | Fahey et al. | |
| 5,440,009 A | 8/1995 | Ash et al. | |
| 5,475,081 A | 12/1995 | Imai et al. | |
| 5,618,981 A | 4/1997 | Shaw | |
| 5,635,587 A | 6/1997 | Koyama et al. | |
| 5,688,908 A | 11/1997 | Haubs et al. | |
| 5,696,282 A | 12/1997 | Shaw et al. | |
| 5,744,576 A | 4/1998 | Miyahara et al. | |
| 5,756,654 A | 5/1998 | Sase et al. | |
| 5,777,069 A | 7/1998 | Tsuda et al. | |
| 5,780,583 A | 7/1998 | Lubowitz et al. | |
| 5,789,533 A | 8/1998 | Yamanaka et al. | |
| 5,804,076 A | 9/1998 | Yamasaki et al. | |
| 5,840,830 A | 11/1998 | Miyahara et al. | |
| 5,856,433 A | 1/1999 | Koyama et al. | |
| 5,894,072 A | 4/1999 | Haubs et al. | |
| 5,898,061 A | 4/1999 | Sase et al. | |
| 5,905,137 A | 5/1999 | Haubs et al. | |
| 5,929,203 A | 7/1999 | Ash et al. | |
| 5,994,416 A * | 11/1999 | Bruck | C08G 75/0281 526/67 |
| 6,201,097 B1 | 3/2001 | Geibel et al. | |
| 6,201,098 B1 | 3/2001 | Haubs et al. | |
| 6,242,501 B1 * | 6/2001 | Green | C08G 75/0281 528/379 |
| 6,281,326 B1 | 8/2001 | Ash et al. | |
| 6,331,608 B1 | 12/2001 | Vidaurri et al. | |
| 6,337,062 B1 | 1/2002 | Akiba | |
| 6,350,852 B1 | 2/2002 | Haubs et al. | |
| 6,388,003 B1 | 5/2002 | Okamoto et al. | |
| 6,538,102 B1 | 3/2003 | Haubs et al. | |
| 6,562,900 B2 | 5/2003 | Okamoto et al. | |
| 6,566,488 B2 | 5/2003 | Okamoto et al. | |
| 6,600,009 B2 | 7/2003 | Inoue et al. | |
| 6,646,105 B2 | 11/2003 | Shirota | |
| 6,734,282 B1 | 5/2004 | Wagener et al. | |
| 6,743,890 B2 | 6/2004 | Bando | |
| 6,750,319 B2 | 6/2004 | Koyama | |
| 6,818,132 B2 | 11/2004 | Haubs et al. | |
| 6,939,942 B2 | 9/2005 | Shirota | |
| 6,982,312 B2 | 1/2006 | Senga et al. | |
| 7,018,574 B2 | 3/2006 | Koyama | |
| 7,026,439 B2 | 4/2006 | Senga et al. | |
| 7,094,867 B2 | 8/2006 | Miyahara et al. | |
| 7,115,704 B2 | 10/2006 | Horiuchi et al. | |
| 7,220,817 B2 | 5/2007 | Matsuzaki et al. | |
| 7,312,300 B2 | 12/2007 | Mitchell | |
| 7,317,072 B2 | 1/2008 | Senga et al. | |
| 7,432,339 B2 | 10/2008 | Mitchell | |
| 7,501,111 B2 | 3/2009 | Keller et al. | |
| 7,504,476 B2 | 3/2009 | Kawama et al. | |
| 7,517,946 B2 | 4/2009 | Sato et al. | |
| 7,569,656 B2 | 8/2009 | Kagoshima et al. | |
| 7,632,915 B2 | 12/2009 | Sato et al. | |
| 7,655,748 B2 | 2/2010 | Sato et al. | |
| 7,750,111 B2 | 7/2010 | Horiuchi et al. | |
| 7,754,795 B2 | 7/2010 | Hintzer et al. | |
| 7,754,848 B2 | 7/2010 | Sato et al. | |
| 7,767,783 B2 | 8/2010 | Kawama et al. | |
| 7,834,133 B2 | 11/2010 | Suzuki et al. | |
| 8,076,423 B2 | 12/2011 | Ishio et al. | |
| 8,076,447 B2 | 12/2011 | Sato et al. | |
| 8,138,302 B2 | 3/2012 | Sato et al. | |
| 8,183,336 B2 | 5/2012 | Sato et al. | |
| 8,211,997 B2 | 7/2012 | Matsuzaki et al. | |
| 8,263,734 B2 | 9/2012 | Fodor et al. | |
| 8,329,832 B2 * | 12/2012 | Horiuchi | C08G 75/0259 528/499 |
| 8,426,552 B2 | 4/2013 | Hinokimori et al. | |
| 8,440,784 B2 | 5/2013 | Kaiho et al. | |
| 8,445,629 B2 | 5/2013 | Hinokimori et al. | |

(56) References Cited

U.S. PATENT DOCUMENTS

| | | |
|---|---|---|
| 8,530,605 B2 | 9/2013 | Konno et al. |
| 8,546,518 B2 | 10/2013 | Unohara et al. |
| 8,563,681 B2 * | 10/2013 | Makita ............... C08J 3/03 |
| | | 528/480 |
| 8,609,790 B2 | 12/2013 | Suzuki et al. |
| 8,680,230 B2 | 3/2014 | Konno et al. |
| 8,883,959 B2 | 11/2014 | Hinokimori |
| 8,921,513 B2 | 12/2014 | Luo et al. |
| 8,981,041 B2 | 3/2015 | Kimura et al. |
| 9,068,047 B2 * | 6/2015 | Ichinose ............ C08G 75/0254 |
| 9,074,048 B2 | 7/2015 | Kim et al. |
| 9,096,723 B2 | 8/2015 | Ichinose et al. |
| 9,187,641 B2 | 11/2015 | Ouchiyama et al. |
| 9,255,350 B2 | 2/2016 | Taniguchi et al. |
| 9,339,778 B2 | 5/2016 | Koizumi et al. |
| 9,388,283 B2 | 7/2016 | Chiong et al. |
| 9,403,948 B2 | 8/2016 | Chioing et al. |
| 9,422,400 B2 | 8/2016 | Konno et al. |
| 9,562,139 B2 | 2/2017 | Chiong |
| 9,587,074 B2 | 3/2017 | Chiong et al. |
| 9,604,156 B2 | 3/2017 | Nekkanti et al. |
| 9,617,387 B2 | 4/2017 | Chiong |
| 9,809,681 B2 | 11/2017 | Nekkanti et al. |
| 9,815,942 B2 | 11/2017 | Chiong |
| 9,988,494 B2 | 6/2018 | Chiong |
| 10,093,562 B2 * | 10/2018 | Balent ................. C02F 1/5245 |
| 10,106,654 B2 * | 10/2018 | Chiong ............ C08G 75/0281 |
| 10,196,487 B2 | 2/2019 | Suzuki et al. |
| 10,280,264 B2 | 5/2019 | Konno et al. |
| 10,407,551 B2 | 9/2019 | Suzuki et al. |
| 10,501,582 B2 | 12/2019 | Konno et al. |
| 10,556,992 B2 | 2/2020 | Miyahara et al. |
| 10,570,255 B2 | 2/2020 | Mokudai et al. |
| 10,577,464 B2 | 3/2020 | Araki et al. |
| 10,647,817 B2 | 5/2020 | Konno et al. |
| 10,647,818 B2 | 5/2020 | Konno et al. |
| 10,731,005 B2 | 8/2020 | Konno et al. |
| 10,822,457 B2 | 11/2020 | Lee et al. |
| 11,312,823 B2 | 4/2022 | Kadoki et al. |
| 11,319,441 B2 | 5/2022 | Chiong |
| 11,407,861 B2 | 8/2022 | Chiong |
| 11,440,996 B2 | 9/2022 | Li et al. |
| 2004/0164443 A1 | 8/2004 | Koyanna |
| 2005/0087215 A1 * | 4/2005 | Miyahara ............ C08G 75/0213 |
| | | 134/32 |
| 2005/0171332 A1 | 8/2005 | Koyama |
| 2008/0097075 A1 * | 4/2008 | Matsuzaki ............ C08G 75/02 |
| | | 528/391 |
| 2010/0163499 A1 | 7/2010 | Odueyungbo |
| 2011/0319587 A1 | 12/2011 | Hinokimori |
| 2013/0068256 A1 | 3/2013 | Kobayashi et al. |
| 2013/0317159 A1 | 11/2013 | Geibel et al. |
| 2014/0288263 A1 * | 9/2014 | Kanomata ............ C08G 75/14 |
| | | 528/373 |
| 2015/0175748 A1 | 6/2015 | Fodor et al. |
| 2017/0158820 A1 * | 6/2017 | Miyahara ............ C08G 75/0204 |
| 2018/0171078 A1 | 6/2018 | Kimura et al. |
| 2018/0171079 A1 | 6/2018 | Miyahara et al. |
| 2018/0346721 A1 | 12/2018 | Lee et al. |
| 2021/0075093 A1 | 3/2021 | Zhang et al. |
| 2023/0073136 A1 * | 3/2023 | Chiong ............ B01D 11/0492 |
| 2023/0086044 A1 * | 3/2023 | Chiong ................ B01D 3/36 |
| | | 201/28 |

FOREIGN PATENT DOCUMENTS

| | | |
|---|---|---|
| EP | 1 837 359 | 9/2007 |
| JP | S5829822 | 2/1983 |
| JP | S5847026 | 3/1983 |
| JP | S58125721 | 7/1983 |
| JP | S59168032 | 9/1984 |
| JP | S6055029 | 3/1985 |
| JP | S60235838 | 11/1985 |
| JP | S61228023 | 10/1986 |
| JP | S62285922 | 12/1987 |
| JP | H0841201 | 2/1996 |
| JP | H08134216 | 5/1996 |
| JP | H08151443 | 6/1996 |
| JP | H08157600 | 6/1996 |
| JP | H08157718 | 6/1996 |
| JP | H08170016 | 7/1996 |
| JP | H08170017 | 7/1996 |
| JP | H08176302 | 7/1996 |
| JP | H08193130 | 7/1996 |
| JP | H08193131 | 7/1996 |
| JP | H08198965 | 8/1996 |
| JP | H08198966 | 8/1996 |
| JP | H08198967 | 8/1996 |
| JP | H08231722 | 9/1996 |
| JP | H08231723 | 9/1996 |
| JP | H08239474 | 9/1996 |
| JP | 2543673 | 10/1996 |
| JP | H08253587 | 10/1996 |
| JP | H08269199 | 10/1996 |
| JP | H08269200 | 10/1996 |
| JP | H08283413 | 10/1996 |
| JP | H08319348 | 12/1996 |
| JP | H09104816 | 4/1997 |
| JP | H09124940 | 5/1997 |
| JP | H09194726 | 7/1997 |
| JP | H09296042 | 11/1997 |
| JP | H107798 | 1/1998 |
| JP | H1045911 | 2/1998 |
| JP | H1045912 | 2/1998 |
| JP | H1060113 | 3/1998 |
| JP | H10110034 | 4/1998 |
| JP | H10158399 | 6/1998 |
| JP | H10195197 | 7/1998 |
| JP | H10245434 | 9/1998 |
| JP | H1180355 | 3/1999 |
| JP | H11169870 | 6/1999 |
| JP | H11349566 | 12/1999 |
| JP | 2000136246 | 5/2000 |
| JP | 2000191785 | 7/2000 |
| JP | 2000239383 | 9/2000 |
| JP | 2001040090 | 2/2001 |
| JP | 2001172387 | 6/2001 |
| JP | 2001181394 | 7/2001 |
| JP | 2002187949 | 7/2002 |
| JP | 2002201274 | 7/2002 |
| JP | 2002201275 | 7/2002 |
| JP | 2002212292 | 7/2002 |
| JP | 2003026803 | 1/2003 |
| JP | 2003275773 | 9/2003 |
| JP | 2004107567 | 4/2004 |
| JP | 2004182753 | 7/2004 |
| JP | 2004352923 | 12/2004 |
| JP | 2005041922 | 2/2005 |
| JP | 2005047953 | 2/2005 |
| JP | 2005264030 | 9/2005 |
| JP | 2005344045 | 12/2005 |
| JP | 2006016567 | 1/2006 |
| JP | 2007077209 | 3/2007 |
| JP | 2007314803 | 12/2007 |
| JP | 2008075055 | 4/2008 |
| JP | 2008239767 | 10/2008 |
| JP | 2008248153 | 10/2008 |
| JP | 2008248154 | 10/2008 |
| JP | 4256506 | 4/2009 |
| JP | 2009185143 | 8/2009 |
| JP | 2010037518 | 2/2010 |
| JP | 2010126621 | 6/2010 |
| JP | 4994997 | 8/2012 |
| JP | 2013023586 | 2/2013 |
| JP | 2017014351 | 1/2017 |
| JP | 2017031404 | 2/2017 |
| JP | 2017043772 | 3/2017 |
| JP | 2017066261 | 4/2017 |
| JP | 2017066374 | 4/2017 |
| JP | 2017071752 | 4/2017 |
| JP | 2017082159 | 5/2017 |
| JP | 2017095562 | 6/2017 |
| JP | 2017095697 | 6/2017 |

(56) References Cited

FOREIGN PATENT DOCUMENTS

| | | |
|---|---|---|
| JP | 2017105981 | 6/2017 |
| JP | 2017114920 | 6/2017 |
| JP | 2017114921 | 6/2017 |
| JP | 2017114922 | 6/2017 |
| JP | 2017114923 | 6/2017 |
| JP | 2017115022 | 6/2017 |
| JP | 2017179102 | 10/2017 |
| JP | 2017210559 | 11/2017 |
| JP | 2017210560 | 11/2017 |
| JP | 2018002829 | 1/2018 |
| JP | 2018009135 | 1/2018 |
| JP | 2018024851 | 2/2018 |
| JP | 2018053195 | 4/2018 |
| JP | 2018053196 | 4/2018 |
| JP | 2018076492 | 5/2018 |
| JP | 2018083910 | 5/2018 |
| JP | 2018119143 | 8/2018 |
| JP | 2018145294 | 9/2018 |
| JP | 2018154691 | 10/2018 |
| JP | 2018154692 | 10/2018 |
| JP | 2018154693 | 10/2018 |
| JP | 2018154731 | 10/2018 |
| JP | 2018162388 | 10/2018 |
| JP | 2018188610 | 11/2018 |
| JP | 2018193497 | 12/2018 |
| JP | 2018199748 | 12/2018 |
| WO | WO 2017130798 | 8/2017 |
| WO | WO 2018120954 | 7/2018 |
| WO | WO 2018164009 | 9/2018 |
| WO | WO 2018164010 | 9/2018 |
| WO | WO 2019004169 | 1/2019 |
| WO | WO 2019004170 | 1/2019 |
| WO | WO 2019044059 | 3/2019 |

\* cited by examiner

US 12,024,596 B2

ANTI-SOLVENT TECHNIQUE FOR RECOVERING AN ORGANIC SOLVENT FROM A POLYARYLENE SULFIDE WASTE SLUDGE

RELATED APPLICATION

The present application is based upon and claims priority to U.S. Provisional Patent Application Ser. No. 63/241,665, having a filing date of Sep. 8, 2021, which is incorporated herein by reference.

BACKGROUND OF THE INVENTION

Polyarylene sulfides are generally formed via polymerization of a dihaloaromatic monomer with an alkali metal sulfide or an alkali metal hydrosulfide in an organic amide solvent. Following formation, the polyarylene sulfide is washed with an organic solvent (e.g., N-methylpyrrolidone) to purify the polymer. During this process, one or more solvent-containing streams are generated and thereafter subjected to a series of distillation steps to recover the organic solvent. A waste stream ("sludge") is also formed during the distillation process that must be disposed off-site. Unfortunately, this waste sludge still contains a fairly significant amount of the organic solvent. As such, a need currently exists for an improved method and system for effectively recovering an organic solvent from the waste sludge generated during formation of a polyarylene sulfide.

SUMMARY OF THE INVENTION

In accordance with one embodiment of the present invention, a method is disclosed for recovering an organic solvent from a process used to form a polyarylene sulfide. The method can include contacting a waste sludge developed in formation of a polyarylene sulfide with an anti-solvent to form a dispersion that includes a solid phase and a liquid phase. The waste sludge can contain from about 10 wt. % to about 90 wt. % of an organic solvent. A method can also include separating the solid phase from the liquid phase, wherein the liquid phase contains the organic solvent and the anti-solvent; and subjecting the liquid phase to a distillation process during which the organic solvent is separated from the anti-solvent and recovered. In some embodiments, a method can also include forming the polyarylene sulfide, for instance according to a process that includes forming a polyarylene sulfide slurry; washing the polyarylene slurry to form a liquid washing product; and subjecting the liquid washing product to a second distillation process that generates the waste sludge. In some embodiments, the waste sludge can be acidified prior to or in conjunction with contacting the waste sludge with the anti-solvent. For instance, the waste sludge can be acidified to a pH of about 7 or less.

In accordance with another embodiment of the present invention, a system is disclosed that comprises an anti-solvent stream that is configured to contact a waste sludge developed in formation of a polyarylene sulfide to form a dispersion that includes a solid phase and a liquid phase; a solid/liquid separation system that is configured to separate the dispersion into a solid phase and a liquid phase containing the organic solvent and the anti-solvent; and a distillation system that is configured to recover the organic solvent from the separated liquid phase. In some embodiments, a system can also include a polymerization system that is configured to generate the polyarylene sulfide; a purification system that is configured to receive a polyarylene sulfide slurry containing the polyarylene sulfide and generate a liquid washing product; and a second distillation system that is configured to receive the liquid washing product and generate a waste sludge.

BRIEF DESCRIPTION OF THE FIGURES

The present disclosure may be better understood with reference to the following figures.

DETAILED DESCRIPTION

It is to be understood by one of ordinary skill in the art that the present discussion is a description of exemplary embodiments only, and is not intended as limiting the broader aspects of the present invention.

Generally speaking, the present invention is directed to methods and systems for recovering an organic solvent from a waste sludge that is generated during formation of a polyarylene sulfide. More particularly, a polyarylene sulfide slurry is initially formed by a polymerization process and thereafter purified by a washing process. A liquid washing product is thus formed, which is subjected to a first distillation process to form an organic solvent-rich stream and a separate waste sludge.

Figure 1:
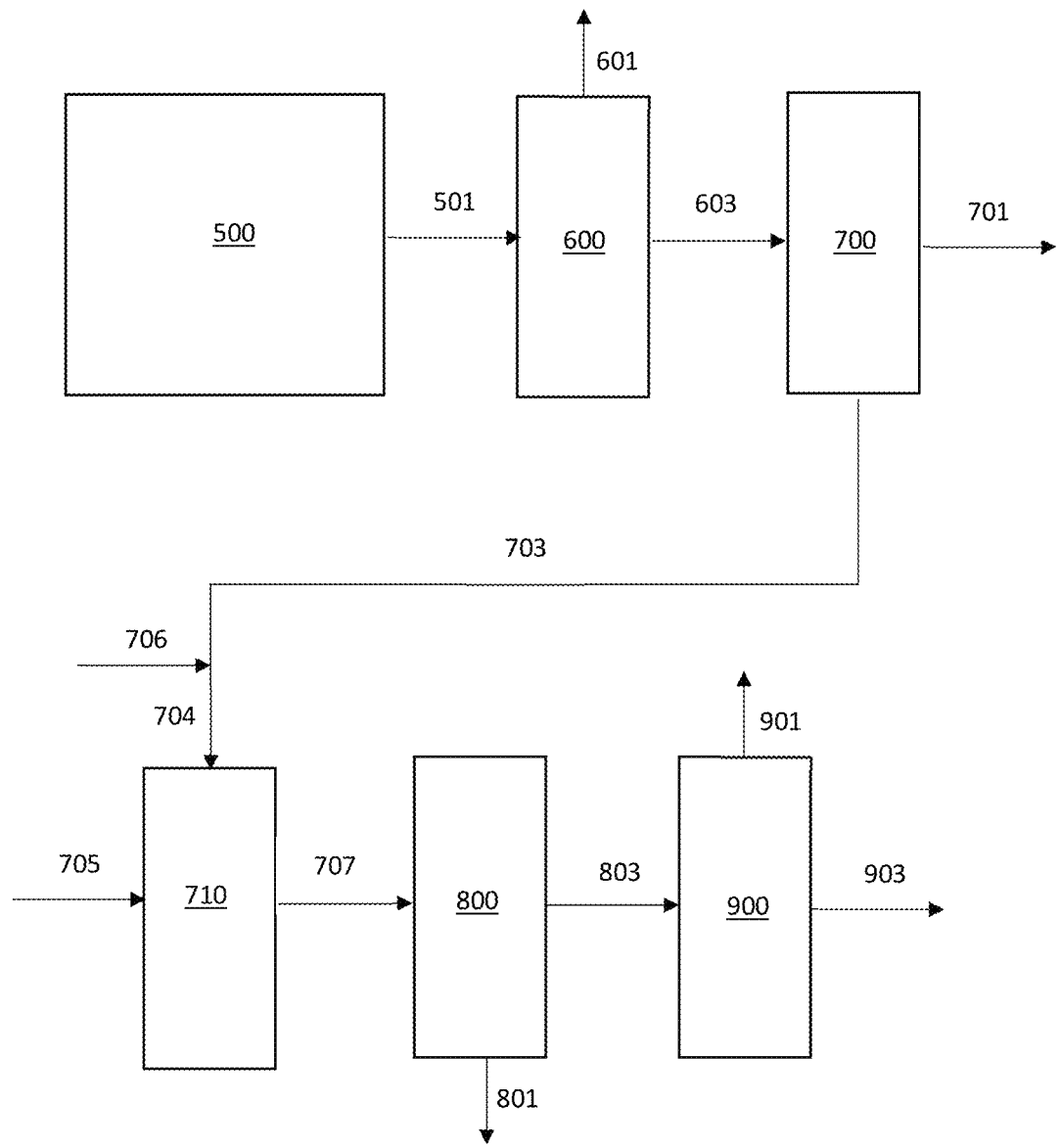
FIG. 1 is a schematic diagram illustrating one embodiment of a process and system of the present invention.

Referring to FIG. 1, a method and system is illustrated. As shown, a system can include a polymerization system 500 that results in formation in a polyarylene sulfide slurry 501. Following formation, the polyarylene sulfide slurry can be passed to a purification system 600, within which the polyarylene sulfide slurry is contacted with a washing solution (not shown in FIG. 1), which results in a purified polyarylene sulfide stream 601 and a liquid washing product 603. The liquid washing product 603 can then be further treated, for instance via a distillation system 700 to generate an organic solvent-rich stream 701 and a waste sludge 703. In some embodiments, the waste sludge 703 can be combined with a stream 706 that includes an acidification agent, and the resulting acidified waste sludge 704 can then be combined 710 with an anti-solvent 705 to create a dispersion 707, which includes a solid phase and a liquid phase. The solid phase is formed by precipitation of a substantial portion, if not all, of the impurities in the waste sludge, such as arylene sulfide oligomers, cyclic polyarylene sulfides, fine polyarylene sulfide particles, and sodium chloride. The liquid phase, on the other hand, contains the anti-solvent and organic solvent (e.g., N-methylpyrrolidone) employed during formation of the polyarylene sulfide. One benefit of this dispersion is that the liquid phase 803 can be readily separated from the solid phase 801 using known solid/liquid separation techniques 800, such as filtration, centrifugation, etc. Once separated, the liquid phase 803 is then subjected to a second distillation process 900 to separate and recover the organic solvent 901 from recoverable anti-solvent 903. The recovered organic solvent may then be used again, such as in the polymerization system during synthesis of the polyarylene sulfide, in the purification system, etc., as can the recovered anti-solvent, such as in the organic solvent recovery system.

I. Polymerization System

As illustrated, the system shown in FIG. 1 includes a polymerization system 500 that results in the formation of a polyarylene sulfide slurry 501. The polyarylene sulfide in the slurry 501 generally has repeating units of the formula:

-[(Ar$^1$)$_n$-X]$_m$-[(Ar$^2$)$_i$-Y]$_j$-[(Ar$^3$)$_k$-Z]$_l$-[(Ar$^4$)$_o$-W]$_p$- wherein,

Ar$^1$, Ar$^2$, Ar$^3$, and Ar$^4$ are independently arylene units of 6 to 18 carbon atoms;

W, X, Y, and Z are independently bivalent linking groups selected from —SO$_2$—, —S—, —SO—, —CO—, —O—, —C(O)O— or alkylene or alkylidene groups of 1 to 6 carbon atoms, wherein at least one of the linking groups is —S—; and n, m, i, j, k, l, o, and p are independently 0, 1, 2, 3, or 4, subject to the proviso that their sum total is not less than 2.

The arylene units Ar$^1$, Ar$^2$, Ar$^3$, and Ar$^4$ may be selectively substituted or unsubstituted. Advantageous arylene units are phenylene, biphenylene, naphthylene, anthracene and phenanthrene. The polyarylene sulfide typically includes more than about 30 mol %, more than about 50 mol %, or more than about 70 mol % arylene sulfide (—S—) units. For example, the polyarylene sulfide may include at least 85 mol % sulfide linkages attached directly to two aromatic rings. In one particular embodiment, the polyarylene sulfide is a polyphenylene sulfide, defined herein as containing the phenylene sulfide structure —(C$_6$H$_4$—S)$_n$— (wherein n is an integer of 1 or more) as a component thereof.

The polyarylene sulfide may be a homopolymer or copolymer. For instance, selective combination of dihaloaromatic compounds may result in a polyarylene sulfide copolymer containing not less than two different units. For instance, when p-dichlorobenzene is used in combination with m-dichlorobenzene or 4,4'-dichlorodiphenylsulfone, a polyarylene sulfide copolymer may be formed containing segments having the structure of formula:

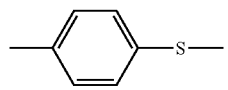

and segments having the structure of formula:

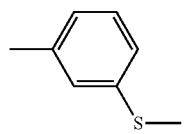

or segments having the structure of formula:

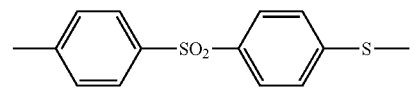

The polyarylene sulfide(s) may be linear, semi-linear, branched or crosslinked. Linear polyarylene sulfides typically contain 80 mol % or more of the repeating unit —(Ar—S)—. Such linear polymers may also include a small amount of a branching unit or a cross-linking unit, but the amount of branching or cross-linking units is typically less than about 1 mol % of the total monomer units of the polyarylene sulfide. A linear polyarylene sulfide polymer may be a random copolymer or a block copolymer containing the above-mentioned repeating unit. Semi-linear polyarylene sulfides may likewise have a cross-linking structure or a branched structure introduced into the polymer a small amount of one or more monomers having three or more reactive functional groups.

Various techniques may generally be employed in the polymerization system 500. By way of example, a process for producing a polyarylene sulfide may include reacting a material that provides a hydrosulfide ion (e.g., an alkali metal sulfide) with a dihaloaromatic compound in an organic amide solvent. The alkali metal sulfide may be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide may be processed according to a dehydrating operation in advance of the polymerization reaction. An alkali metal sulfide may also be generated in situ. In addition, a small amount of an alkali metal hydroxide may be included in the reaction to remove or react impurities (e.g., to change such impurities to harmless materials) such as an alkali metal polysulfide or an alkali metal thiosulfate, which may be present in a very small amount with the alkali metal sulfide.

The dihaloaromatic compound may be, without limitation, an o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds may include, without limitation, p-dichlorobenzene; m-dichlorobenzene; o-dichlorobenzene; 2,5-dichlorotoluene; 1,4-dibromobenzene; 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone. The halogen atom may be fluorine, chlorine, bromine or iodine, and two halogen atoms in the same dihalo-aromatic compound may be the same or different from each other. In one embodiment, o-dichlorobenzene, m-dichlorobenzene, p-dichlorobenzene or a mixture of two or more compounds thereof is used as the dihaloaromatic compound. As is known in the art, it is also possible to use a monohalo compound (not necessarily an aromatic compound) in combination with the dihaloaromatic compound in order to form end groups of the polyarylene sulfide or to regulate the polymerization reaction and/or the molecular weight of the polyarylene sulfide.

Although by no means required, the polyarylene sulfide can, in certain embodiments be formed in a multi-stage process that includes at least two separate formation stages. One stage of the formation process may include reaction of a complex that includes a hydrolysis product of an organic amide solvent and alkali metal hydrogen sulfide with a dihaloaromatic monomer to form a prepolymer. Another stage of the process may include further polymerization of the prepolymer to form the final product. Optionally, the process may include yet another stage in which the organic amide solvent and an alkali metal sulfide are reacted to form the complex. If desired, the different stages may take place in different reactors. The utilization of separate reactors for each of the stages may decrease cycle time, as the total cycle time may be equal to that of the slowest stage, rather than the sum of all stages as in a single reactor system. In addition, the utilization of separate reactors may decrease capital costs, as smaller reactors may be utilized than would be necessary for the same size batch in a single reactor system. Moreover, as each reactor need only meet the specifications of the stage being carried out in that reactor, a single, large reactor that meets the most stringent parameters of all stages of the formation process is no longer necessary, which may further decrease capital costs.

In one embodiment, for instance, the polymerization system 500 may employ a multi-stage process may be employed that utilizes at least two separate reactors. The first reactor may be utilized for a first stage of the process during which an organic amide solvent and an alkali metal sulfide react to form a complex that includes a hydrolysis product of the organic amide solvent (e.g., an alkali metal organic amine carboxylic acid salt) and an alkali metal hydrosulfide. Exemplary organic amide solvents as may be used in a forming the polyarylene sulfide may include, without limitation, N-methyl-2-pyrrolidone; N-ethyl-2-pyrrolidone; N,N-dimethylformamide; N,N-dimethylacetamide; N-methylcaprolactam; tetramethylurea; dimethylimidazolidinone; hexamethyl phosphoric acid triamide and mixtures thereof. The alkali metal sulfide may be, for example, lithium sulfide, sodium sulfide, potassium sulfide, rubidium sulfide, cesium sulfide or a mixture thereof. An alkali metal sulfide may also be generated in situ. For instance, a sodium sulfide hydrate may be prepared within the first reactor from sodium hydrogen sulfide and sodium hydroxide that may be fed to the reactor. When a combination of alkali metal hydrogen sulfide and alkali metal hydroxide are fed to the reactor to form the alkali metal sulfide, the molar ratio of alkali metal hydroxide to alkali metal hydrogen sulfide may be between about 0.80 and about 1.50. In addition, a small amount of an alkali metal hydroxide may be included in the first reactor to remove or react impurities (e.g., to change such impurities to harmless materials) such as an alkali metal polysulfide or an alkali metal thiosulfate, which may be present in a very small amount with the alkali metal sulfide.

The feed to the first reactor may include sodium sulfide ($Na_2S$) (which may be in the hydrate form), N-methyl-2-pyrrolidone (NMP) and water. Reaction between the water, sodium sulfide and the NMP may form a complex including sodium methylaminobutyrate (SMAB—a hydrolysis product of NMP) and sodium hydrogen sulfide (NaSH) (SMAB-NaSH) according to the following reaction scheme:

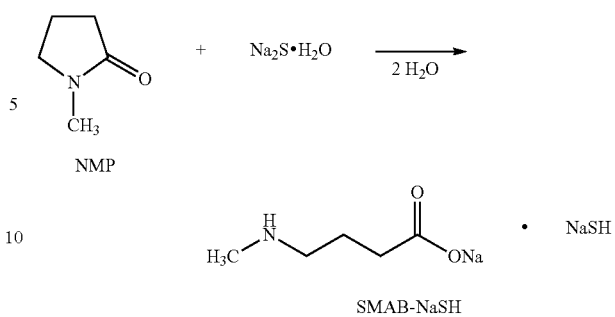

According to one embodiment, a stoichiometric excess of the alkali metal sulfide may be utilized in the first stage reactor, though this is not a requirement of the formation stage. For instance, the molar ratio of organic amide solvent to sulfur in the feed may be from 2 to about 10, or from about 3 to about 5, and the molar ratio of water to the sulfur source in the feed may be from about 0.5 to about 4, or from about 1.5 to about 3.

During the formation of the complex, the pressure within the first reactor may be held at or near atmospheric pressure. To maintain the low pressure reaction conditions, vapor may be removed from the reactor. The main constituents of the vapor may include water and hydrogen sulfide by-product. Hydrogen sulfide of the vapor can, for instance, be separated at a condenser. A portion of the water that is separated at such a condenser may be returned to the reactor to maintain the reaction conditions. Another portion of the water may be removed from the process so as to dehydrate the SMAB-NaSH solution formed in the first stage. For instance, the molar ratio of water to NaSH (or the ratio of oxygen to sulfur) in the product solution of the first reactor may less than about 1.5, or may be between about 0.1 and about 1 such that the SMAB-NaSH complex solution that is fed to the second stage reactor is near-anhydrous.

Once formed, the SMAB-NaSH complex may then be fed to a second reactor in conjunction with a dihaloaromatic monomer (e.g., p-dichlorobenzene) and a suitable solvent so as to form the polyarylene sulfide prepolymer in the second stage of the process. The amount of the dihaloaromatic monomer(s) per mole of the effective amount of the charged alkali metal sulfide may generally be from about 1.0 to about 2.0 moles, in some embodiments from about 1.05 to about 2.0 moles, and in some embodiments, from about 1.1 to about 1.7 moles. If desired, the dihaloaromatic monomer may be charged into the second reactor with a relatively low molar ratio of the dihaloaromatic monomer to the alkali metal hydrogen sulfide of the complex. For instance, the ratio of the dihaloaromatic monomer to sulfur charged to the second reactor may be from about 0.8 to about 1.5, and in some embodiments, from about 1.0 to about 1.2. The relatively low ratio of the dihaloaromatic monomer to the alkali metal hydrogen sulfide of the complex may be favorable for the formation of the final high molecular weight polymer via the condensation polymerization reaction. The ratio of solvent to sulfur in the second stage may also be relatively low. For instance, the ratio of the alkali metal hydrogen sulfide of the complex to the organic amide solvent in the second stage (including the organic solvent added to the second reactor and solvent remaining in the complex solution from the first reactor) may be from about 2 to about 2.5. This relatively low ratio may increase the concentration of reactants in the second reactor, which may increase the relative polymerization rate and the per volume polymer production rate.

The second reactor may include a vapor outlet for removal of vapor during the second stage in order to maintain the desired pressure level. For instance, the second reactor may include a pressure relief valve as is known in the art. Vapor removed from the second stage may be condensed and separated to recover unreacted monomer for return to the reactor. A portion of the water of the vapor may be removed to maintain the near-anhydrous conditions of the second stage, and a portion of the water may be returned to the second reactor. A small amount of water in the second reactor may generate reflux in the top of the reactor, which may improve separation between the water phase and the organic solvent phase in the reactor. This may in turn minimize loss of the organic solvent in the vapor phase removed from the reactor as well as minimize loss of hydrogen sulfide in the vapor stream due to absorption of the hydrogen sulfide by the highly alkaline organic solvent as discussed previously.

The second stage polymerization reaction may generally be carried out at a temperature of from about 200° C. to about 280° C., or from about 235° C. to about 260° C. The duration of the second stage may be, e.g., from about 0.5 to about 15 hours, or from about 1 to about 5 hours. Following the second stage polymerization reaction, the product solution that exits second stage reactor may include the prepolymer, the organic solvent, and one or more salts that are formed as a by-product of the polymerization reaction. For example, the proportion by volume of the prepolymer solution exiting the second stage reactor of salt that is formed as a byproduct to the reaction may be from about 0.05 to about 0.25, or from about 0.1 to about 0.2. Salts included in the reaction mixture may include those formed as a byproduct during the reaction as well as other salts added to the reaction mixture, for instance as a reaction promoter. The salts may be organic or inorganic, i.e., may consist of any combination of organic or inorganic cations with organic or inorganic anions. They may be at least partially insoluble in the reaction medium and have a density different from that of the liquid reaction mixture. According to one embodiment, at least a portion of the salts in the prepolymer mixture that exits the second stage reactor may be removed from the mixture. For instance, the salts may be removed by use of screens or sieves as has been utilized in traditional separation processes. A salt/liquid extraction process may alternatively or additionally be utilized in separating the salt from the prepolymer solution. In one embodiment, a hot filtration process may be utilized in which the solution may be filtered at a temperature at which the prepolymer is in solution and the salts are in the solid phase. According to one embodiment, a salt separation process may remove about 95% or more of the salts including in the prepolymer solution that exits the second reactor. For instance, greater than about 99% of the salts may be removed from the prepolymer solution.

Following the prepolymer polymerization reaction in the second stage of the process and the filtration process, an optional third stage of the formation may take place during which the molecular weight of the prepolymer is increased in a third reactor. Input to the third reactor may include the prepolymer solution from the second reactor in addition to solvent, one or more dihaloaromatic monomers, and a sulfur-containing monomer. For instance, the amount of the sulfur-containing monomer added in third stage may be about 10% or less of the total amount required to form the product polyarylene sulfide. In the illustrated embodiment, the sulfur-containing monomer is sodium sulfide, but this is not a requirement of the third stage, and other sulfur containing monomers, such as an alkali metal hydrogen sulfide monomer may alternatively be utilized.

The third reaction conditions may be nearly anhydrous, with the ratio of water to the sulfur-containing monomer less than about 0.2, for instance between 0 and about 0.2. The low water content during the third stage of the process may increase the polymerization rate and the polymer yield as well as reduce formation of undesired side reaction by-products as the conditions are favorable for nucleophilic aromatic substitution, as discussed above. Moreover, as pressure increases in the third stage are generally due to water vaporization, low water content during this stage may allow the third reaction to be carried out at a constant, relatively low pressure, for instance less than about 1500 kPa. As such, the third reactor 104 need not be a high pressure reactor, which may provide substantial cost savings to a formation process as well as decrease safety risks inherent to high pressure reactors.

The reaction conditions within the third reactor may also include a relatively low molar ratio for the solvent to the sulfur-containing monomer. For instance, the ratio of solvent to sulfur-containing monomer may be from about 2 to about 4, or from about 2.5 to about 3. The reaction mixture of the third stage may be heated to a temperature of from about 120° C. to about 280° C., or from about 200° C. to about 260° C. and the polymerization may continue until the melt viscosity of the thus formed polymer is raised to the desired final level. The duration of the second polymerization step may be, e.g., from about 0.5 to about 20 hours, or from about 1 to about 10 hours. The weight average molecular weight of the formed polyarylene sulfide may vary as is known, but in one embodiment may be from about 1000 g/mol to about 500,000 g/mol, from about 2,000 g/mol to about 300,000 g/mol, or from about 3,000 g/mol to about 100,000 g/mol.

Following the third stage, and any desired post-formation processing, the polyarylene sulfide may be discharged from the third reactor, typically through an extrusion orifice fitted with a die of desired configuration, cooled, and collected. Commonly, the polyarylene sulfide may be discharged through a perforated die to form strands that are taken up in a water bath, pelletized and dried. The polyarylene sulfide may also be in the form of a strand, granule, or powder.

II. Purification System

Referring again to FIG. 1, a purification system 600 is also employed for washing the polyarylene sulfide slurry 501 formed via the polymerization system 500. Within the system 600, the polyarylene sulfide slurry is contacted with a washing solution (not shown in FIG. 1), which results in a purified polyarylene sulfide stream 601 and a liquid washing product 603.

One or more solvents are typically incorporated into the washing solution. Any of a variety of solvents may be employed, such as water, organic solvents, etc. In one embodiment, for example, water may be employed, either alone or in combination with an organic solvent. Particularly suitable organic solvents include aprotic solvents, such as halogen-containing solvents (e.g., methylene chloride, 1-chlorobutane, chlorobenzene, 1,1-dichloroethane, 1,2-dichloroethane, chloroform, and 1,1,2,2-tetrachloroethane); ether solvents (e.g., diethyl ether, tetrahydrofuran, and 1,4-dioxane); ketone solvents (e.g., acetone and cyclohexanone); ester solvents (e.g., ethyl acetate); lactone solvents (e.g., butyrolactone); carbonate solvents (e.g., ethylene carbonate and propylene carbonate); amine solvents (e.g., triethylamine and pyridine); nitrile solvents (e.g., acetonitrile and succinonitrile); amide solvents (e.g., N,N'-dimethylformamide, N,N'-dimethylacetamide, tetramethylurea and N-methylpyrrolidone); nitro-containing solvents (e.g., nitromethane and nitrobenzene); sulfide solvents (e.g., dimethylsulfoxide and sulfolane); and so forth. Regardless of the particular solvents employed, the entire solvent system (e.g., water and N-methylpyrrolidone) typically constitutes from about 80 wt. % to about 99.9 wt. %, in some embodiments from about 85 wt. % to about 99.8 wt. %, and in some embodiments, from about 90 wt. % to about 99.5 wt. % of the washing solution.

Other suitable materials may also be used in the washing solution, such as stabilizers, surfactants, pH modifiers, etc. For example, basic pH modifiers may be employed to help raise the pH of the washing solution to the desired level, which is typically above 7, in some embodiments from about 9.0 to about 13.5, and in some embodiments, from about 11.0 to about 13.0. Suitable basic pH modifiers may include, for instance, ammonia, alkali metal hydroxides (e.g., sodium hydroxide, lithium hydroxide, potassium hydroxide, etc.), alkaline earth metal hydroxides, etc., as well as combinations thereof. If desired, the solution may be heated prior to and/or during contact with the polyarylene sulfide to improve washing efficiency. For example, the solution may be heated to a temperature of about 100° C. or more, in some embodiments about 110° C. or more, in some embodiments from about 120° C. to about 300° C., and in some embodiments, from about 130° C. to about 220° C. In certain cases, heating may be conducted at a temperature that is above the atmospheric pressure boiling point of a solvent in the mixture. NMP, for instance, has a boiling point at atmospheric pressure of about 203° C. In such embodiments, the heating is typically conducted under a relatively high pressure, such as above 1 atm, in some embodiments above about 2 atm, and in some embodiments, from about 3 to about 10 atm.

Figure 2:
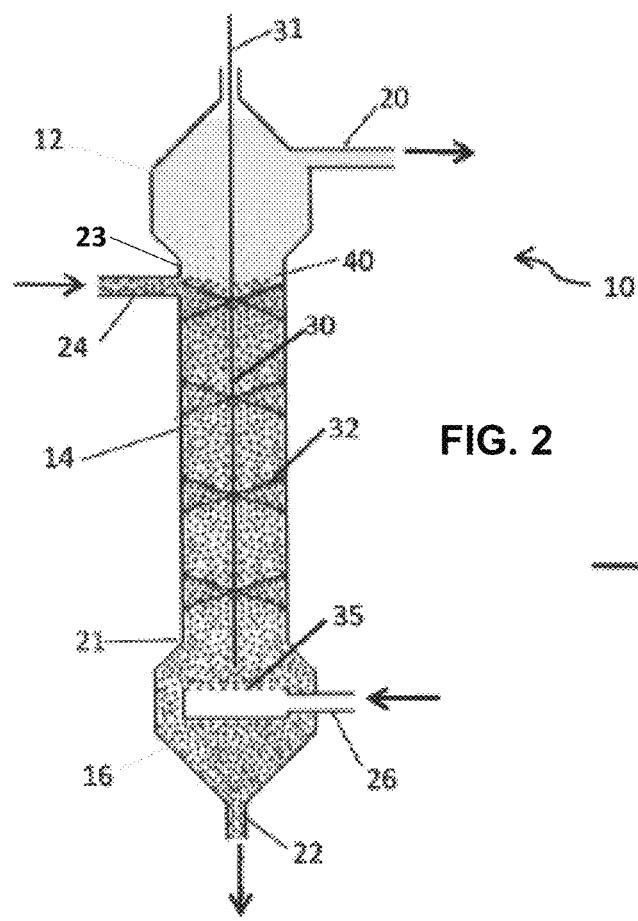
FIG. 2 illustrates one embodiment of a sedimentation column that may be employed in the present invention.
Figure 3:
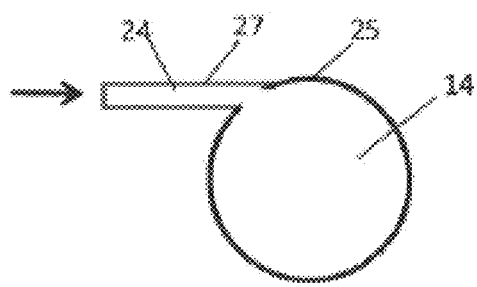
FIG. 3 illustrates a cross-sectional top view of the middle section of the sedimentation column of FIG. 2 at the slurry inlet.
Figure 4:
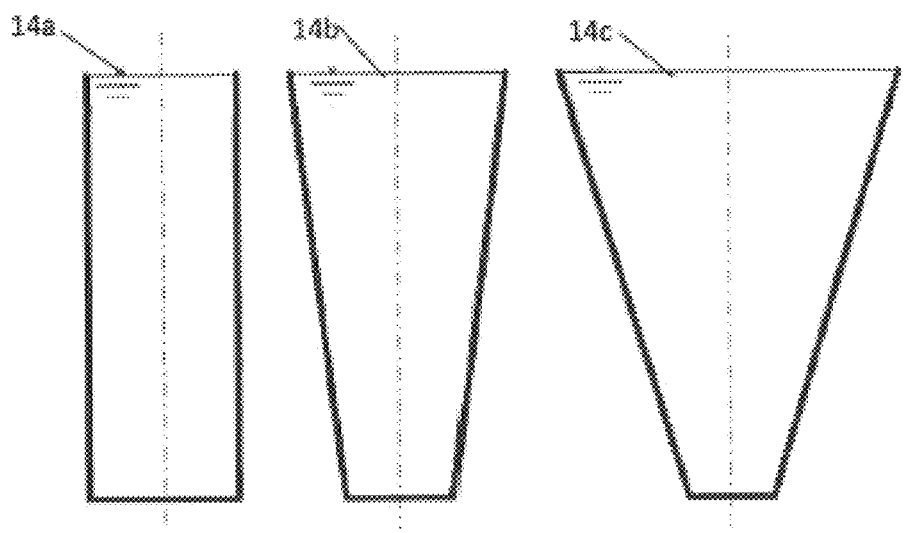
FIG. 4 illustrates several different embodiments of longitudinal cross-sectional shapes of a middle section of a sedimentation column that may be employed in the present invention.

The manner in which the polyarylene sulfide is contacted with the washing solution may vary as desired. In one embodiment, for instance, the purification system 600 may include a vessel, such as a bath, sedimentation column, etc., within which the polyarylene sulfide is contacted with the washing solution. Referring to FIG. 2, FIG. 3, FIG. 4, for instance, one embodiment of a sedimentation column 10 that can be employed in the purification system 600 is shown in FIG. 2 that can be configured to receive a polyarylene sulfide and washing solution. The sedimentation column 10 may include an upper section 12 that includes liquid outlet 20, a middle section 14 that includes inlet 24, and a lower section 16 that includes a solids outlet 22 and a liquid inlet 26. Though illustrated with a vertical arrangement, it should be understood that the sedimentation column may be utilized at other than a vertical arrangement, and the sedimentation column may be at an angle to vertical as long as solids flow through the sedimentation column from the inlet 24 to the outlet 22 may be by gravitational force.

The upper section 12 and the lower section 16 may have cross sectional areas that are larger than that of the middle section 14. In one embodiment, the sections of the sedimentation column 10 may be circular in cross section, in which case the upper section 12 and lower section 16 may have cross sectional diameters that are larger than the cross sectional diameter of the middle section 14. For instance, the upper section 12 and the lower section 16 may have diameters that are from about 1.4 to about 3 times greater than the diameter of the middle section. For instance, the upper and lower sections may independently have diameters that are about 1.4, about 2, or about 2.5 times greater than the diameter of the middle section 14. The larger cross sectional area of the upper section 12 may prevent overflow of solids at the outlet 20 and the larger cross sectional area of the lower section 16 may prevent solids flow restriction at the outlet 22. It should be understood that the sedimentation column 10 is not limited to any particular geometric shape and the cross section of the sedimentation column is not limited to circular. Moreover, the cross sectional shape of each section of the sedimentation column may vary with regard to one another. For example, one or two of the upper section 12, the middle section 14, and the lower section 16 may have an oval-shaped cross section, while the other section(s) may be round in cross section.

The middle section 14 of the sedimentation column 10 may include an inlet 24 through which a polymer slurry may be fed to the sedimentation column 10. The slurry may include the polyarylene sulfide in conjunction with other byproducts from the formation process, such as reaction solvents (e.g., N-methylpyrrolidone), salt byproducts, unreacted monomers or oligomers, etc. As shown in FIG. 3, the inlet 24 meets a wall 25 of the middle section 14 substantially tangent to the wall 25. The term "substantially tangent" as utilized herein may be determined by the distance between the true tangent of the wall 25 of the middle section 14 and the outer wall 27 of the inlet 24. When the inlet 24 meets the wall 25 of the middle section at a perfect tangent, this distance will be 0. In general, this distance will be less than about 5 centimeters, for instance less than about 3 centimeters. Placement of the inlet 24 such that the inlet 24 is substantially tangent to the outer wall 25 of the middle section 14 may prevent disruption of the fluid flow pattern within the sedimentation column 10. This may improve contact and mass transfer between the downward flowing solids and the upward flowing liquid and may also prevent loss of solids through the outlet 20 of the upper section 12. To further ensure that solids are not lost through the outlet 20, the inlet 24 may be placed in the middle section 14 at a distance from the junction 23 where the middle section 14 meets the upper section 12. For instance, the vertical distance between the midpoint of the inlet 24 and the junction 23 may be equal to or greater than about 5% of the total height of the middle section 14. For instance, the vertical distance between the midpoint of the inlet 24 and the junction 23 may be from about 5% to about 50% of the total height of the middle section 14. The total height of the middle section 14 is that distance between the junction 23, where the upper section 12 meets the middle section 14 and the junction 21, where the middle section 14 meets the lower section 16.

The inlet 24 may carry the slurry from a polymerization system 500 to the middle section 14 of the sedimentation column 10. The middle section 14 of the sedimentation column 10 may include an agitator 30 that incorporates an axial shaft 31 and a series of stirring blades 32 along the axial length of the middle section 14. The agitator 30 may minimize channeling of liquid within the sediment (fluidized bed) and may maintain contact between the slurry contents and an upwardly flowing solvent as well as maintain flow of the solids through the sedimentation column 10. The stirring blades 32 may extend from the axial shaft 31 toward the wall 25 of the middle section 14. In general, the stirring blades may extend at least half of the distance from the axial shaft to the wall 25 and, in one embodiment, may extend almost all of the way to the wall 25. In one embodiment, the sedimentation column may be free of sedimentation plates or trays as have been utilized in previously known sedimentation columns.

As shown, the axial shaft 31 may support a series of stirring blades 32 along the length of the middle section 14.

In general, at least two stirring blades 32 may extend from the axial shaft 31 in a balanced arrangement at each point of blade extension. This is not a requirement, however, and three, four, or more stirring blades may extend from the axial shaft 31 at a single location along the shaft 31 or alternatively, a single blade may extend from a single location on the shaft 31 and the stirring blades may be offset from one another as they pass down the length of the shaft 31 so as to maintain balance of the agitator 30 during use. The axial shaft 31 may have stirring blades 32 extending therefrom at a plurality of locations along the shaft 31. For instance, the axial shaft may have stirring blades extending therefrom at from about 3 to about 50 locations along axial shaft 31, with two or more stirring blades 32 extending from the axial shaft at each location. In one embodiment, the distribution of the blades along the axial shaft 31 may be such that there are more blades in the fluidized bed section at the bottom as compared to the number of blades in the upper portion of section 14. During operation, the axial shaft 31 may rotate at a speed that is typically from about 0.1 rpm to about 1000 rpm, for instance from about 0.5 rpm to about 200 rpm or from about 1 rpm to about 50 rpm.

In the illustrated embodiment, a countercurrent flow is employed in which the polymer slurry flow is in a direction opposite to that of the flow of the washing solution. Referring again to FIG. 2, for instance, the polymer slurry is fed to the middle section 14 of the sedimentation column 10 via the inlet 24. The washing solution is, on the other hand, fed to the lower section 16 of the column 10 via an inlet 26. In this manner, the washing solution can flow upwardly through the column as it contacts the polymer slurry as it flows downwardly through the column towards the solids outlet 22. If desired, the inlet 26 may include a distributor 35 that may enhance fluid flow through the solids and prevent solids from entering the inlet 26. The lower section 16 may also have a conical shape to concentrate the solids content at the outlet 22. The solids content of the slurry at the outlet 22 may generally be about 20 wt. % or greater, or about 22 wt. % or greater in some embodiments. If desired, the washing solution may be heated prior to being fed to the inlet 26. In such embodiments, the sedimentation column may include heating elements to maintain an elevated temperature during the washing process.

If desired, a fluidized bed may also be formed in the sedimentation column with increasing concentration of solids from the top of the bed to the solids outlet 22. The fluidized bed height may be monitored and controlled so as to better control the residence time of solids in the sedimentation column. Through improved control of residence time for the sedimentation column, the efficiency of the separation process carried out within the sedimentation column may be improved, which may translate to lower operational costs and improved separations. In addition, control of the fluidized bed height and residence time may help to prevent solids loss through the liquid outlet 20 of the upper section 12. A sensor may be used to monitor the fluidized bed height within the sedimentation column 10. The sensor type is not limited and may be any suitable sensor that may monitor the fluidized bed height including both internal sensors and external sensors. For example, sensors may utilize, without limitation, optical, infrared, radio frequency, displacement, radar, bubble, vibrational, acoustic, thermal, pressure, nuclear and/or magnetic detection mechanisms to determine the fluidized bed height within the sedimentation column 10. By way of example, in one embodiment, an optical sensor 40 (e.g., a laser-based sensor including a laser source and a detector) may be located within the middle section 14 of the sedimentation column 10, for instance near the level of the inlet 24, which may detect reflection of the laser to determine relative density differences of the materials within the sedimentation column 10 and thus convey information concerning the location of the top of the fluidized bed to a control system. The control system may relay that information to a valve that may control flow of solids out of the sedimentation column at outlet 22 and/or a valve that may control flow of solids into the sedimentation column at inlet 24 so as to control the bed height. Surge tanks may also be included in the lines leading to and from the sedimentation column as is known to maintain control of the fluidized bed height. Other systems as are known in the art for controlling the height of a fluidized bed may alternatively be utilized, and the method and system utilized to control the bed height is not particularly limited. The top of the fluidized bed may be at or near the inlet 24. To improve control of the residence time of the solids in the sedimentation column 10, the sediment bed height variation during the process may vary less than about 10% of the total height of the middle section 14. For instance, the fluidized bed height variation during a process may be less than about 5% of the total height of the middle section 14.

Though illustrated in FIG. 2 as a cylindrical column, the longitudinal cross-sectional shape of the middle section 14 is not limited to this embodiment. For example, and as illustrated in FIG. 4, middle sections 14a, 14b, and 14c of sedimentation columns may be straight or tapered with increasing angles from a cylindrical middle section as illustrated at 14a to increasing angles as shown at 14b and 14c. When tapered, the middle section may be wider at the top than at the bottom so as to increase solids concentration at the bottom of the sedimentation column without impeding transport of solids. That is, if the angle of taper is too large, solids flow may be impeded at the wall of the middle section. A preferred taper angle will vary for each system depending upon flow rates, physical properties of the compounds to be carried within the system such as particle size and shape, as well as depending on column materials and surface roughness.

In certain embodiments, the polyarylene sulfide can be contacted with the washing solution in a single step. For example, a single sedimentation column can be employed within which the polyarylene sulfide is washed. In alternative embodiments, however, multiple washing steps may be employed. The washing solutions employed in the stages of such a process need not be the same. In one embodiment, for instance, multiple sedimentation columns may be used in series, one or more of which have a countercurrent flow such as described above.

Figure 5:
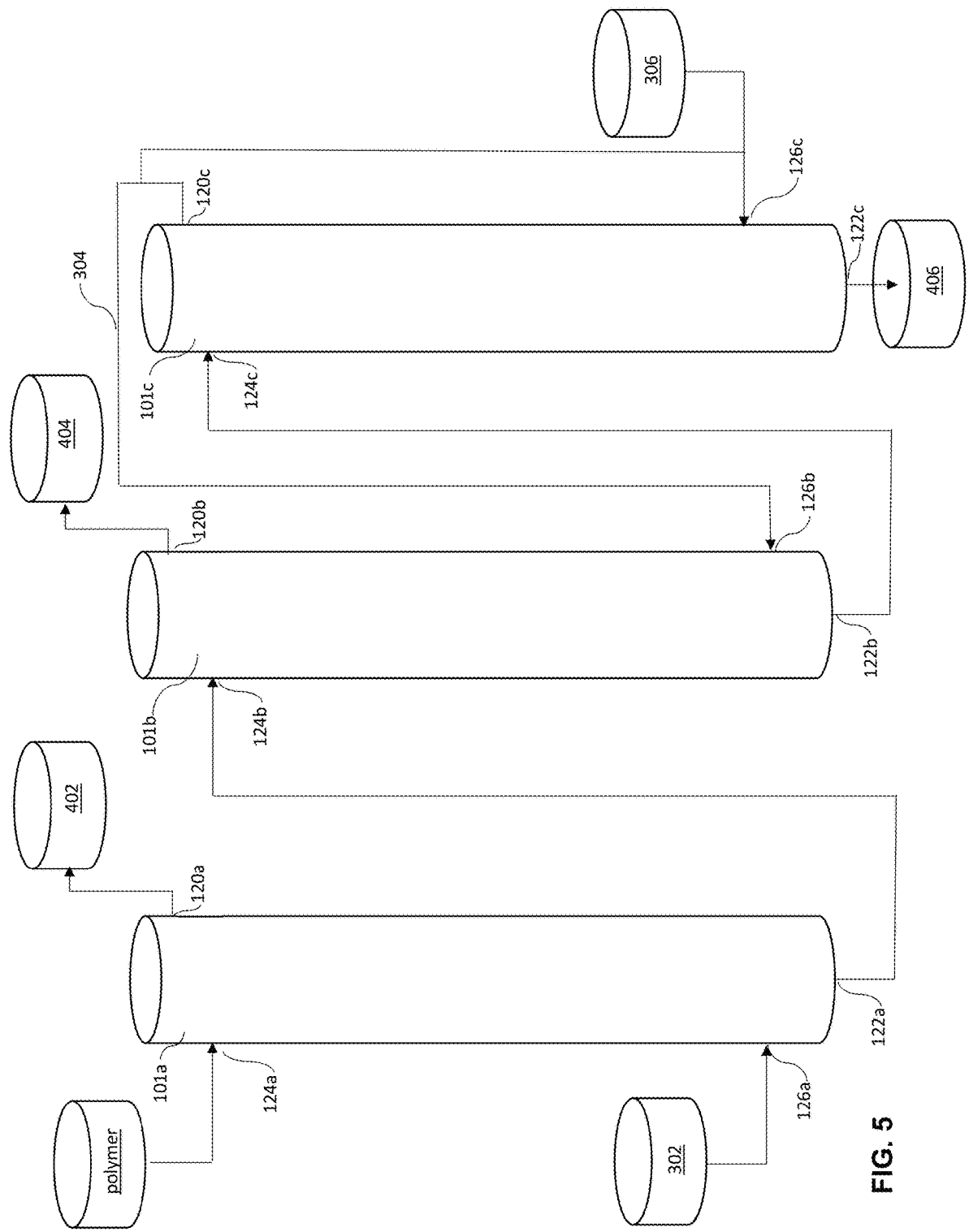
FIG. 5 illustrates one embodiment of a washing system that may be employed in the present invention.

Referring to FIG. 5, for instance, one embodiment of a washing process is shown that employs three sedimentation columns 101a, 101b, and 101c in series. While the system may include one or more sedimentation columns having the design as described above, this is not a requirement of the disclosed systems. For instance, the system may include sedimentation columns that vary somewhat in design from the sedimentation column described above, e.g., the sedimentation columns of the system of FIG. 5 do not include upper and lower sections having a larger cross sectional area as compared to the middle section. In any case, the system may include multiple sedimentation columns 101a, 101b, and 101c in series.

To initiate flow through the first sedimentation column 101a, it may be initially supplied with a polymer slurry via inlet 124a. A first washing solution 302 may likewise be supplied to the column 101a via inlet 126a. The first washing solution 302 will generally flow upwardly through the column in a direction counter to that of the polymer slurry until reaching an outlet 120a, where a first wash product 402 is removed which may include the solution and dissolved compounds of the polymer slurry feed. As shown, a solids outlet 122a may thereafter feed solids from the first sedimentation column 101a to a slurry inlet 124b of the second sedimentation column 101b. A second washing solution 304 will generally flow upwardly through the column 101b via an inlet 126b in a direction counter to that of the solids until reaching an outlet 120b, where a second wash product 404 is removed. Although not required, the second washing solution 304 can be a recycle stream that is removed from the third sedimentation column 101c via an outlet 120c. In the final sedimentation column 101c, the solids from the second sedimentation column may be fed via inlet 124c. A third washing solution 306 will generally flow upwardly through the column 101c via an inlet 126c in a direction counter to that of the solids, which exits the column via an outlet 122c to form the polymer product 406. As noted above, the washing solutions employed in each stage of the washing process may vary, if desired. For instance, the first washing solution 302 and/or second washing solution 304 may contain an organic solvent (e.g., N-methylpyrrolidone), either as the only solvent in the solution or in combination with other types of solvents (e.g., water). The third washing solution 306 may likewise contain water, either alone or in combination with other types of solvents.

Referring again to FIG. 1, the washed polyarylene sulfide 601 may be removed from the purification system 600 and dried according to any technique known in the art. Drying may occur at a temperature of from about 80° C. to about 250° C., in some embodiments from about 100° C. to about 200° C., and in some embodiments, from about 120° C. to about 180° C. The purity of the resulting polyarylene sulfide may be relatively high, such as about 95% or more, or about 98% or more. The purified polyarylene sulfide may also have a relatively high molecular weight, such as weight average molecular weight of from about 30,000 to about 60,000 Daltons, in some embodiments about 35,000 Daltons to about 55,000 Daltons, and in some embodiments, from about 40,000 to about 50,000 Daltons. The polydispersity index (weight average molecular weight divided by the number average molecular weight) may likewise be relatively low, such as about 4.3 or less, in some embodiments about 4.1 or less, and in some embodiments, from about 2.0 to about 4.0. The number average molecular weight of the polyarylene sulfide may, for instance, be from about 8,000 about 12,500 Daltons, in some embodiments about 9,000 Daltons to about 12,500 Daltons, and in some embodiments, from about 10,000 to about 12,000 Daltons. Molecular weight may be determined by converting the polymer to PPSO by oxidation with a mixture of cold $HNO_3$ (50%) in a trifluoroacetic acid mixture, dissolving the PPSO in warm hexafluoroisopropanol (HFIP) for 1 hour, and then analyzing for molecular weight by GPC equipped with PSS-hexafluoroisopropanol (HFIP) gel columns, which may be fitted with an HFIP-gel guard column using HFIP as mobile phase and refractive index as a detector.

The liquid washing product 603 may likewise be removed from the purification system 600. As noted above, the washing product 603 may be derived from a single liquid stream, such as the liquid washing product exiting the outlet 20 in FIG. 2. Likewise, the washing product 603 may be derived from multiple liquid streams, such as the liquid washing products exiting the outlets 120a, 120b, and/or 120c in FIG. 5. Regardless, the washing product 603 generally contains an organic solvent (e.g., N-methylpyrrolidone), which may be a residue of the polymerization and/or washing processes. The washing product 603 may also contain water and/or various impurities, such as arylene sulfide oligomers, cyclic polyarylene sulfides, salts, etc.

III. First Distillation System

To help recover the organic solvent (e.g., N-methylpyrrolidone) from the washing product 603, a first distillation system 700 is also employed in the embodiment of FIG. 1. The first distillation system 700 may include one or a series of distillation columns to remove a substantial portion of the organic solvent and generate an organic solvent-rich stream 701. The organic solvent-rich stream 701 may, for instance, contain organic solvents in an amount of about 70 wt. % or more, in some embodiments about 80 wt. % or more, and in some embodiments, from about 90 wt. % to 100 wt. % of the stream. Examples of various suitable distillation techniques are described, for instance, in U.S. Pat. No. 4,976,825 to Iwasaki, et al. and U.S. Pat. No. 5,167,775 to Omori, et al. Distillation may, for instance, be performed at a temperature of from about 190° C. to about 300° C., and in some embodiments, from about 200° C. to about 290° C., and at a pressures of from about 50 to about 750 Torr, and in some embodiments, from about 100 to about 500 Torr.

In addition to generating the organic solvent-rich stream 701, the first distillation system 700 also generates a waste sludge 703. The waste sludge 703 contains various impurities formed during the polymerization process. Examples of such impurities include, for instance, volatile organic compounds, sodium chloride, low molecular weight arylene sulfide oligomers, cyclic polyarylene sulfides, and fine polyarylene sulfide particles having an average diameter of, for instance, less than 50 micrometers. A "low molecular weight" oligomer typically refers to an arylene sulfide having a number average molecular weight of less than about 2,000 Daltons, in some embodiments about 1,500 Daltons or less, and in some embodiments, from about 100 to about 1,000 Daltons. The polydispersity index of such oligomers is typically high, such as above about 7, in some embodiments about 9 or more, and in some embodiments, from about 10 to about 20. The weight average molecular weight may likewise be about less than about 20,000 Daltons, in some embodiments about 15,000 Daltons or less, and in some embodiments, from about 1,000 to about 12,000 Daltons. Cyclic polyarylene sulfides may also be present in the waste slurry, which typically have the following general formula:

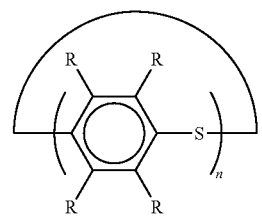

wherein, n is from 4 to 30; and

R is independently hydrogen, alkyl, cycloalkyl, aryl, alkylaryl, or an arylalkyl radical having from about 6 to about 24 carbon atoms.

Furthermore, because the distillation system 700 is not capable of removing all of the organic solvent from the washing product 603, the waste sludge 703 will still contain some portion of an organic solvent. As noted above, the organic solvent may be an amide solvent, such as N-methyl-2-pyrrolidone; N-ethyl-2-pyrrolidone; N,N-dimethylformamide; N,N-dimethylacetamide; N-methylcaprolactam; tetramethylurea; dimethylimidazolidinone; hexamethyl phosphoric acid triamide and mixtures thereof. Typically, the organic solvent constitutes from about 10 wt. % to about 85 wt. %, in some embodiments from about 20 wt. % to about 80 wt. %, and in some embodiments, from about 30 wt. % to about 50 wt. % of the waste sludge 703. Likewise, the impurities typically constitute from about 15 wt. % to about 90 wt. %, in some embodiments from about 20 wt. % to about 80 wt. %, and in some embodiments, from about 50 wt. % to about 70 wt. % of the waste sludge 703.

IV. Organic Solvent Recovery

As illustrated in FIG. 1, to recover the organic solvent, in some embodiments the waste sludge 703 can be acidified by combination with an acid, which can be supplied in an acid solution stream 706. The acid solution stream 706 can include an acidifying agent, such as, without limitation, sulfuric acid, phosphoric acid, hydrochloric acid, nitric acid, carboxylic acids, halogenated carboxylic acids, or combinations thereof. In some embodiments, the acidifying agent can be a non-volatile agent, such as phosphoric acid, sulfuric acid, acetoacetic acid, beta-hydroxybutyric acid, etc., which can avoid acid contamination issues in subsequent solvent recovery steps. The acid solution can include an acidifying agent in an amount of about 50 wt. % or more in some embodiments, for instance about 60 wt. % or more or about 70 wt. % or more, such as about 50 wt. % to about 90 wt. %, or about 70 wt. % to about 85 wt. % in some embodiments.

When incorporated, the acid solution 706 can be combined with the waste sludge 703 in an amount such that upon combination, the acidified waste sludge 704 has a pH of less than 7, such as about 6 or less or about 5 or less in some embodiments. For instance, the acidified waste sludge 704 can include the acid solution in an amount of about 10 wt. % or less, such as about 7 wt. % or less, such as from about 3 wt. % to about 5 wt. %, in some embodiments.

Acidification of the waste sludge can be carried out prior to or contemporaneously with addition of the anti-solvent. Upon acidification various components of the waste sludge can be affected. Exemplary oligomer acidification schemes can include, without limitation:

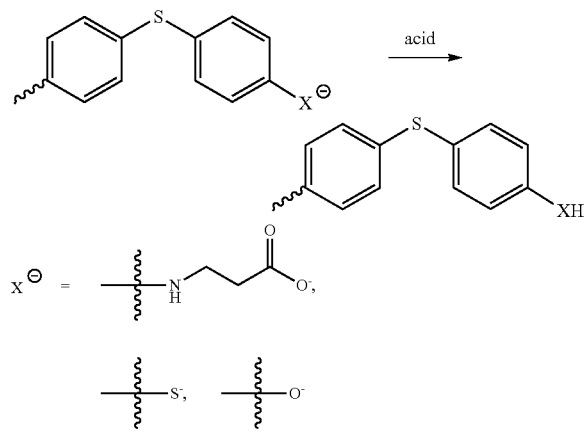

Acidification of the waste sludge can reduce solubility of materials contained in the waste sludge, such as oligomers, and thereby increase the solid phase content of the sludge. Acidification of the waste sludge can also increase agglomeration of particulates and fines, for instance by reducing electrostatic repulsion between particles. Thus, acidification of the waste sludge can improve separation of solid from liquids in subsequent separation steps and improve recovery of organic solvents from the waste sludge.

The acidified waste sludge 704 (or the waste sludge 703 in those embodiments in which the waste sludge is not acidified) can be combined with an anti-solvent, which can be supplied in a separate stream 705. The source of the anti-solvent stream 705 may vary as desired. In certain embodiments, for instance, the anti-solvent stream 705 may be used during purification of the polyarylene sulfide, such as a washing solution employed in the purification system 600. Suitable anti-solvents may include, for instance, lower alkanols having 1 to 10 carbon atoms (e.g., methanol, ethanol, n-propanol, isopropanol, n-butanol, isobutanol, t-butanol, etc.); ketones having 2 to 10 carbon atoms (e.g., acetone); and alkanes having 5 to 10 carbon atoms (e.g., hexane), as well as mixtures of any of the foregoing. Acetone is particularly suitable when N-methylpyrrolidone is the organic solvent contained in the waste sludge 703. Regardless, contact of the waste sludge 703 with the anti-solvent 705, for instance in a stirred tank 710, forms a dispersion 707, which includes a separate solid phase and liquid phase. The solid phase is formed by precipitation of a substantial portion, if not all, of the impurities in the waste sludge 703, such as the arylene sulfide oligomers, cyclic polyarylene sulfides, fine polyarylene sulfide particles, and sodium chloride. In fact, in certain embodiments, such components may constitute about 70 wt. % or more, in some embodiments about 80 wt. % or more, and in some embodiments, from about 90 wt. % to 100 wt. % of the precipitated solid phase. The liquid phase, on the other hand, generally contains the organic solvent employed during formation of the polyarylene sulfide (e.g., N-methylpyrrolidone) and the anti-solvent. The anti-solvent typically constitutes from about 50 wt. % to about 90 wt. %, in some embodiments from about 60 wt. % to about 85 wt. %, and in some embodiments, from about 65 wt. % to about 80 wt. % of the separated liquid phase, while the organic solvent typically constitutes from about 10 wt. % to about 50 wt. %, in some embodiments from about 15 wt. % to about 40 wt. %, and in some embodiments, from about 20 wt. % to about 35 wt. % of the separated liquid phase. Depending upon the specific liquid extractant used, the temperature of the mixture 1110 can be, for example, about 50° C. or greater, such as about 60° C. or greater, about 70° C. or greater, or about 80° C. or greater, such as from about 75° C. to about 100° C., or about 90° C. in some embodiment.

A solid/liquid separation system 800 can be used to readily separate the dispersion 707 into a solid phase 801 and a liquid phase 803. The system 800 may employ any of a variety of known solid/liquid separation devices, such as a filter, centrifuge, decanter, sedimentation column, etc. Suitable filtration devices may include, for instance, screen filters, rotating filters, continuous rotary vacuum filters, continuous moving bed filters, batch filters, etc. Although not shown in detail herein, the separated solid phase 801 can be removed as waste or recycled and converted into a high molecular weight polyarylene sulfide.

In some embodiments, the solid/liquid separation system 800 can include multiple separation steps. For instance, a filtration operation can include multiple washings of the solids with, e.g., an anti-solvent and/or water, which can increase removal of organic solvent from a filter cake. For instance, a washing step can include washing of a filter cake with from about 100 grams to about 200 grams liquid per kilogram of solids, such as from about 150 grams to about 175 grams liquid per kilogram sold. Optionally, multiple separation approaches can be combined together such as multiple washings, centrifugations, filtrations, etc.

The liquid phase 803 can be subjected to a distillation process within a second distillation system 900 to separate the organic solvent 903 (e.g., N-methylpyrrolidone) from the anti-solvent 901 (e.g., acetone). The second distillation system 900 may employ one or a series of distillation columns. Distillation may, for instance, be performed at a temperature of from about 190° C. to about 300° C., and in some embodiments, from about 200° C. to about 290° C., and at a pressures of from about 50 to about 750 Torr, and in some embodiments, from about 100 to about 500 Torr. Regardless of the conditions employed, the organic solvent 903 may be recovered and used in a variety of different processes, if so desired. In certain embodiments, for example, the organic solvent 903 may be recycled and used in the polymerization system 500 during synthesis of the polyarylene sulfide. The organic solvent 903 may also be used in the purification system 600 as a washing solution.

The present invention may be better understood with reference to the Examples, set forth below.

EXAMPLE 1

Waste sludge from a polyarylene sulfide formation process was examined. The waste sludge included 17 wt. % solids (mostly NaCl), and 83 wt. % liquids.

The waste sludge was subjected to a filtration process following which the filter cake (53 wt. % solids) was subjected to a re-slurry operation to with either acetone (ATN) or water ($H_2O$) as the re-slurry liquid in a weight ratio of either 2:1 or 1:1.

Following re-slurry, the resulting sludge was examined at a shear rate of 4 $s^{-1}$ to compare viscosity characteristics. As shown in Table 1, below, slurries that included acetone as the re-slurry liquid had a lower viscosity as compared to water-based re-slurries and at shear rates of 10 to 1,000 $s^{-1}$, the acetone re-slurries were conducive to both pumping and mixing.

TABLE 1

| Slurry liquid | sludge:liquid | Viscosity (cP) |
|---|---|---|
| ATN | 2:1 | 5699 |
| ATN | 1:1 | 500 |
| $H_2O$ | 2:1 | 6299 |
| $H_2O$ | 1:1 | 2040 |

Figure 6:
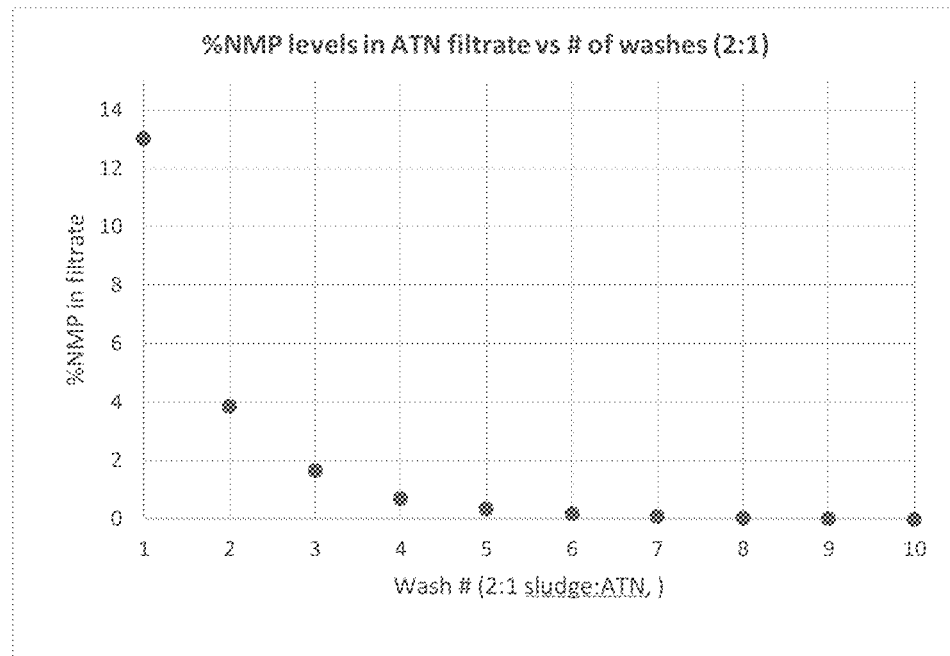
FIG. 6 presents the organic solvent content of a filtrate following each of several re-slurry/filter steps of an organic solvent recovery process.

Multiple re-slurry/filter steps were carried out with the waste sludge using a 2:1 sludge:acetone re-slurry formation. FIG. 6 presents the % organic solvent (N-methylpyrrolidone, NMP) in the filtrate following each wash. As shown, there was less than 1% organic solvent present in the filtrate from the third wash on.

Figure 7:
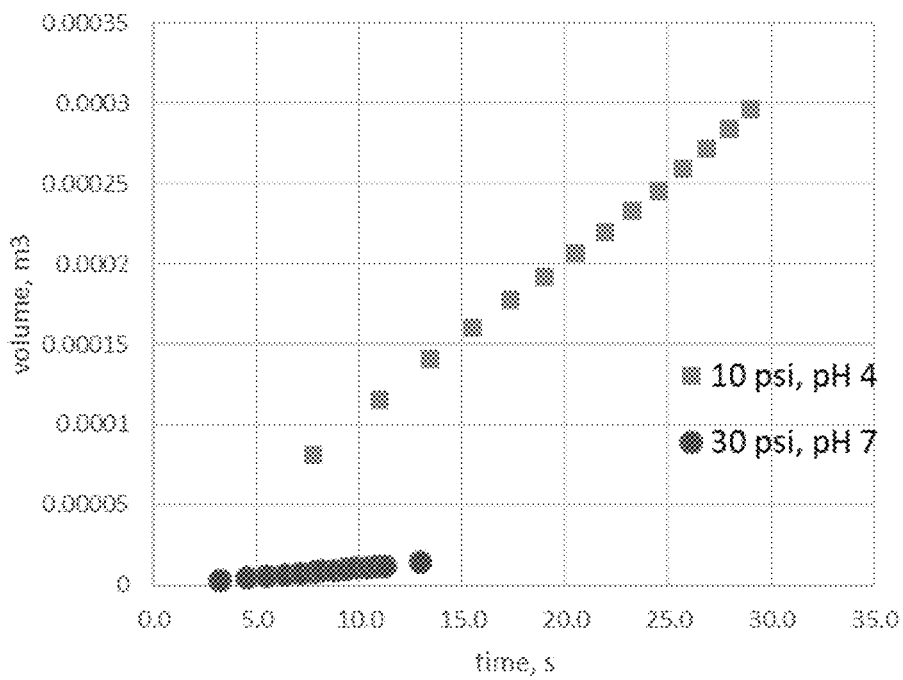
FIG. 7 compares the filterability of a waste sludge at pH 7 and at pH 4.

The effect of pH on the filterability of the waste sludge was examined. An 85% solution of $H_3PO_4$ was utilized to adjust the waste sludge pH to varying levels. FIG. 7 compares the filterability of the waste sludge at pH 7 and following acidification to pH 4. As shown, at pH 7, even utilizing a higher pressure of 30 psi, the filterability of the sludge was much lower than that of the waste sludge pH adjusted to pH 4 and filtered at a pressure of 10 psi.

Figure 8:
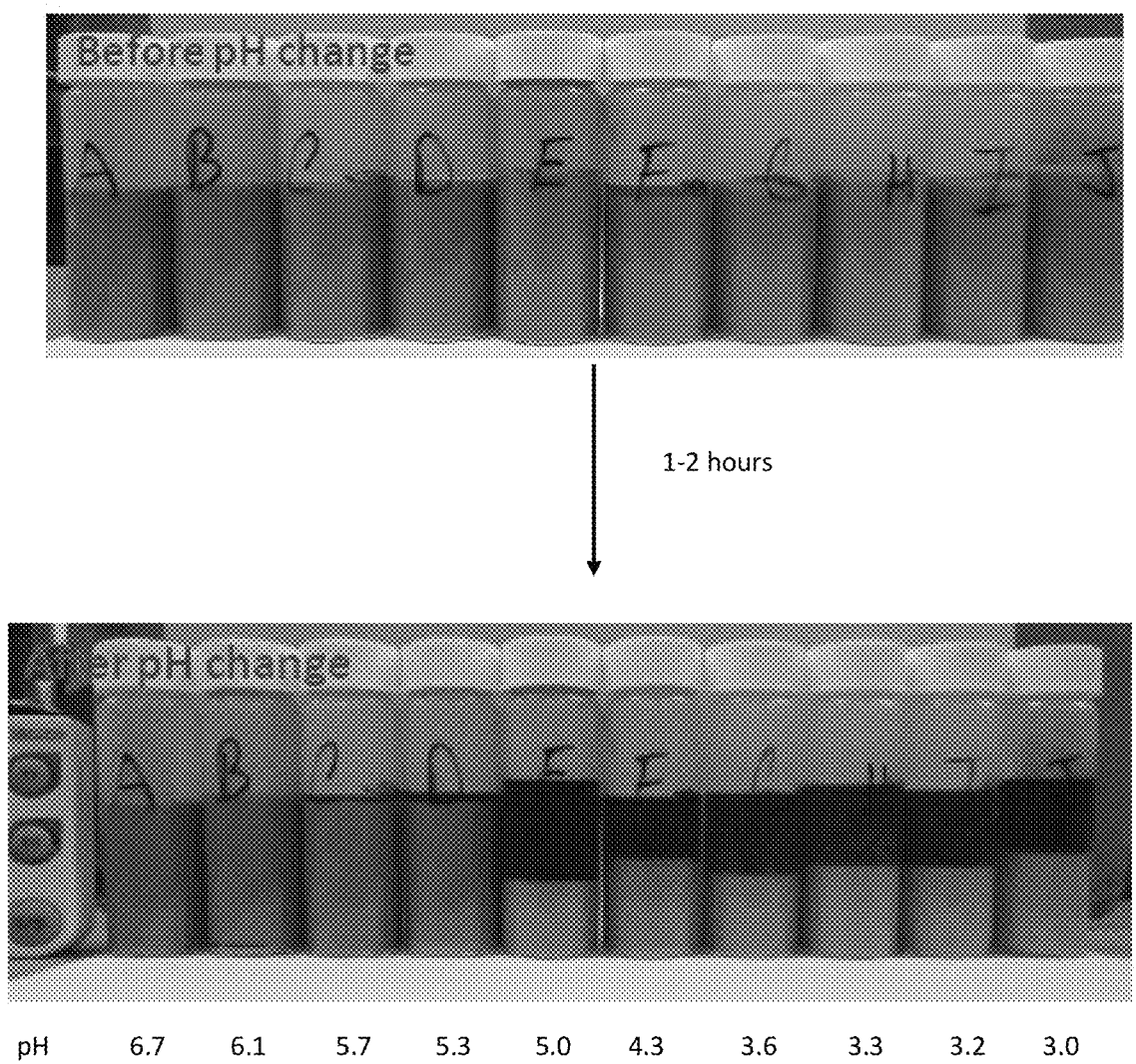
FIG. 8 illustrates the agglomeration of solids in a slurry at various acidification levels.

Ten samples of the waste sludge were pH adjusted to various levels between pH 6.7 and pH 3.0. As shown in FIG. 8, following acidification, the solids of the samples exhibited increased agglomeration of solids, particularly at a pH of about 5 and lower.

EXAMPLE 2

Waste sludge from a polyarylene sulfide formation process was examined. The waste sludge included 17 wt. % solids (mostly NaCl), and 83 wt. % liquids.

Samples of the waste sludge were combined with acetone and phosphoric acid in various amounts as shown in Table 2. The resulting mixture was then subjected to centrifugation at 3250 rpm. The time to form a filter cake in the centrifuge and the % NMP in the resulting filter cake are shown in Table 2.

TABLE 2

| Sample # | kg ATN/kg waste sludge | % $H_3PO_4$ | Time to filter (min)[1] | % NMP in cake[2] |
|---|---|---|---|---|
| 1 | 1 | 0.7 | 1 | 0.7 |
| 2 | 0.5 | 0.7 | 2 | 1.3 |
| 3 | 0.25 | 0.7 | 4 | 2.5 |
| 4 | 0 | 0.7 | 10 | 3.4[3] |
| 5 | 0 | 0.3 | 15 | 6.9[3] |
| 6 | 0 | 0.2 | 16 | 4.2 |

[1]at 3250 rpm bench centrifuge filter
[2]after 2 washes with acetone (2.5 = total ATN used for wash equal to 20% of feed
[3]reduced to <1% NMP if 5.2 wash As can be seen, the time for filtration improved with acidification, even without initial acetone dilution, and the residual organic acid in the filter cake was substantially decreased upon both acidification and anti-solvent treatment.

While particular embodiments of the present disclosure have been illustrated and described, it would be obvious to those skilled in the art that various other changes and modifications may be made without departing from the spirit and scope of the disclosure. It is therefore intended to cover in the appended claims all such changes and modifications that are within the scope of this disclosure.

What is claimed is:

1. A method for recovering an organic solvent from a waste sludge developed in formation of a polyarylene sulfide, the method comprising:
    generating the waste sludge in a first distillation process, wherein an input to the first distillation process includes a liquid washing product obtained upon washing a polyarylene sulfide slurry formed in a polyarylene sulfide polymerization process;
    contacting the waste sludge with an anti-solvent to form a dispersion that includes a solid phase and a liquid phase, the waste sludge containing from about 10 wt. % to about 70 wt. % of an organic solvent;
    separating the solid phase from the liquid phase, wherein the liquid phase contains the organic solvent and the anti-solvent; and
    subjecting the liquid phase to a second distillation process during which the organic solvent is separated from the anti-solvent and recovered.

2. The method of claim 1, wherein the polyarylene sulfide slurry is washed with a washing solution that contains the organic solvent.

3. The method of claim 1, wherein the polyarylene sulfide slurry is contacted with a washing solution within a sedimentation column.

4. The method of claim 1, wherein the anti-solvent is derived from a stream used during washing of the polyarylene sulfide slurry.

5. The method of claim 1, further comprising acidifying the waste sludge, wherein the acidified waste sludge has a pH of less than about 7.

6. The method of claim 5, wherein the waste sludge is acidified prior to contacting the waste sludge with the anti-solvent.

7. The method of claim 1, wherein the organic solvent is an organic amide solvent.

8. The method of claim 7, wherein the organic amide solvent is N-methylpyrrolidone.

9. The method of claim 1, wherein the waste sludge contains an arylene sulfide oligomer, a cyclic polyarylene sulfide, sodium chloride, fine polyarylene sulfide particles, volatile organic compounds, or a combination thereof.

10. The method of claim 1 wherein the anti-solvent includes a lower alkanol having 1 to 10 carbon atoms, a ketone having 2 to 10 carbon atoms, an alkane having 5 to 10 carbon atoms, or a combination thereof.

11. The method of claim 1, wherein the anti-solvent includes acetone.

12. The method of claim 1, wherein the anti-solvent constitutes from about 50 wt. % to about 90 wt. % of the separated liquid phase and the organic solvent constitutes from about 10 wt. % to about 50 wt. % of the separated liquid phase.

13. The method of claim 1, further comprising recycling the recovered organic solvent into a process for forming the polyarylene sulfide, a process for washing the polyarylene sulfide, or a combination thereof.

14. The method of claim 1, wherein the polyarylene sulfide is a polyphenylene sulfide.

* * * * *